US012667861B2

(12) United States Patent
Ketterling

(10) Patent No.: US 12,667,861 B2
(45) Date of Patent: Jun. 30, 2026

(54) ADJUSTABLE SPRINKLER RISER

(71) Applicant: Kody J. Ketterling, Twin Falls, ID (US)

(72) Inventor: Kody J. Ketterling, Twin Falls, ID (US)

( * ) Notice: Subject to any disclaimer, the term of this patent is extended or adjusted under 35 U.S.C. 154(b) by 0 days.

(21) Appl. No.: 18/649,995

(22) Filed: Apr. 29, 2024

(65) Prior Publication Data

US 2024/0359202 A1 Oct. 31, 2024

Related U.S. Application Data

(60) Provisional application No. 63/462,962, filed on Apr. 28, 2023.

(51) Int. Cl.
*B05B 15/628* (2018.01)
*B05B 15/625* (2018.01)

(52) U.S. Cl.
CPC .......... *B05B 15/628* (2018.02); *B05B 15/625* (2018.02)

(58) Field of Classification Search
CPC ... B05B 15/628; B05B 15/625; B05B 15/622; B05B 15/74; B05B 15/68; F16L 27/12
USPC .................................................. 137/363, 370
See application file for complete search history.

(56) References Cited

U.S. PATENT DOCUMENTS

| | | | | | |
|---|---|---|---|---|---|
| 219,098 | A * | 9/1879 | Jewell | F16L 27/12 | 285/302 |
| 469,005 | A * | 2/1892 | Anderson | F16L 5/00 | 52/220.8 |
| 479,909 | A * | 8/1892 | Hurley | H02G 3/185 | 220/3.7 |
| 754,414 | A * | 3/1904 | Bossert | H02G 3/185 | 220/3.7 |
| 1,555,207 | A * | 9/1925 | Hojo | B05B 15/622 | 248/85 |
| 1,833,040 | A * | 11/1931 | Rader | B05B 15/74 | 239/203 |
| 3,317,144 | A * | 5/1967 | Muschett | B05B 15/74 | 285/302 |
| 4,018,386 | A | 4/1977 | Barichello | | |
| 5,133,501 | A | 7/1992 | Marshall | | |

(Continued)

OTHER PUBLICATIONS

Amazon: https://www.amazon.com/10-Pack-Cut-off-Sprinkler-Extension/dp/B00LORBMU0, retrieved from the Internet on Feb. 3, 2025.

(Continued)

*Primary Examiner* — Craig M Schneider
*Assistant Examiner* — Andrew J Rost
(74) *Attorney, Agent, or Firm* — Burdick Patents, P.A.; Sean D. Burdick; Colin L. Honan

(57) ABSTRACT

An adjustable riser connectable to a sprinkler includes a stationary channel and a hollow sleeve movable over the stationary channel. The hollow sleeve partially encloses the stationary channel to define an internal volume. Recessed columns each having a vertical slot connected to a plurality of notches are defined in the outer surface of the stationary channel. A collar engages the lower end of the hollow sleeve. One or more pins extend through the collar and hollow sleeve to contact the stationary channel to allow the sleeve to be moved vertically over the stationary channel and rotated into one of the notches to lock the sleeve into a set vertical position.

19 Claims, 4 Drawing Sheets

(56) References Cited

U.S. PATENT DOCUMENTS

| | | | | |
|---|---|---|---|---|
| 6,050,500 | A * | 4/2000 | Ensworth | B05B 15/656 239/206 |
| 6,193,168 | B1 | 2/2001 | Bedford | |
| 6,629,648 | B1 * | 10/2003 | Jones | B05B 15/74 239/206 |
| 6,648,241 | B1 | 11/2003 | Doshay | |
| 6,874,696 | B1 | 4/2005 | Ericksen et al. | |
| 7,114,665 | B1 * | 10/2006 | Mc Tee | B05B 15/74 239/288.5 |
| 7,686,236 | B2 | 3/2010 | Alexander | |
| 7,832,659 | B1 | 11/2010 | Collins | |
| 8,430,339 | B2 | 4/2013 | Stewart et al. | |
| 9,243,944 | B2 * | 1/2016 | Floyd | E03B 9/08 |
| 9,765,913 | B2 | 9/2017 | Magargal et al. | |
| 10,293,359 | B1 * | 5/2019 | Polen | B05B 15/74 |
| 2003/0042327 | A1 | 3/2003 | Beutler et al. | |
| 2005/0194464 | A1 | 9/2005 | Bruninga | |
| 2011/0259977 | A1 | 10/2011 | Lo | |
| 2018/0141060 | A1 | 5/2018 | Walker et al. | |

OTHER PUBLICATIONS https://www.doityourself.com/stry/3-sprinkler-riser-types, retrieved from the Internet on Feb. 3, 2025.

https://www.irrigationtutorials.com/sprinkler-head-risers/, retrieved from the Internet on Feb. 3, 2025.

Installing Risers & Sprinkler Heads: https://www.hometips.com/diy-how-to/sprinkler-heads-risers-installing.html, , retrieved from the Internet on Feb. 3, 2025.

Sprinkler Lift product: https://www.sprinklerlift.com, retrieved from the Internet on Feb. 3, 2025.

Sprinkler Warehouse: https://www.sprinklerwarehouse.com/Riser-Extension-p/37056.htm, retrieved from the Internet on Feb. 3, 2025.

* cited by examiner

ADJUSTABLE SPRINKLER RISER

RELATED APPLICATIONS

This application claims priority to U.S. Provisional Application 63/462,962 filed Apr. 28, 2023, the contents of which are fully incorporated herein by reference.

BACKGROUND OF THE INVENTION

Field of the Invention

The present invention relates generally to sprinklers and irrigation systems, and, more particularly, to sprinkler risers for use in irrigation systems.

Description of Related Art

Sprinklers and irrigation systems are well known, particularly, residential irrigation systems that use a variety of pop-up or other types of sprinklers. In conventional irrigation systems, a primary water line is connected to the water source and then run through an area to be irrigated. The primary water line is typically buried underground at least four inches deep and in some cases can be buried a foot or more under the ground. To connect the sprinkler to the primary water line, a coupling is used. Depending on the location of the sprinkler along the primary water line, the coupling will typically be either a T-coupling or an elbow coupling, where a T-coupling is conventionally used at intermediate positions along the length of the water line and the elbow coupling is used at the end of the water line. A sprinkler can thereafter be threaded or otherwise attached to the coupling and the water line buried or re-buried in the yard.

However, depending on the depth to which the water line is initially buried, and on the size of the sprinkler enclosure, it may be necessary to attach a riser between the coupling and the sprinkler to raise the sprinkler to a sufficient height to achieve desired coverage. Further, as soil and other debris builds up around the sprinkler over time, it may be necessary to raise the sprinkler to a greater height. An operator may opt to install a riser in such a scenario as opposed to replacing the sprinkler with a larger one. The installation typically involves digging down to the base of the sprinkler enclosure and detaching the sprinkler from the water line. Thereafter, a riser can be attached between the sprinkler and the water line to raise the sprinkler.

Prior art risers are well known in the art. These risers typically come in the form of a conventional riser, a cut-off riser, a swing joint riser and a flex riser. Conventional risers are essentially just a length of rigid tubing that has threads at either end to connect to the coupling and the sprinkler. Conventional risers come in a variety of predetermined, nonadjustable lengths. The operator or maintenance technician will typically need to carry a variety of such lengths in inventory to ensure that a desired length is readily available when installing a riser.

The cut-off riser is essentially the same as the conventional riser except the entire length of tubing includes threads. The length of threaded tubing allows an operator to customize the riser by cutting a portion off to achieve the desired length. For instance, the cut-off riser might come in a 12-inch length of tubing and have preset cut lines every 1-inch, allowing the operator to install a riser of any length, in 1-inch increments, up to 12-inches. These riser types are also rigid and the length cannot be increased once the riser has been cut.

Swing joint risers also include a length of rigid tubing and have a rotatable coupling at either end. The rotatable coupling allows an operator to offset the sprinkler relative to the water line so that the sprinkler is not positioned directly above the line. The swing joint riser also allows for limited adjustment of the height of the sprinkler by an operator rotating one or both of the couplings at either end.

The flex risers typically include a length of flexible tubing with a threaded coupling at either end. The flexible tubing allows the operator to adjust the path and position of the riser by bending the tube during installation. This allow the operator to make a minor adjustment to the height of a sprinkler head without having to cut any pieces. The flex riser, however, is susceptible to damage, and to blockage due to kinking, due to the inherent pliability of the flexible tube. What is needed is a riser design that simplifies height adjustment.

SUMMARY OF THE INVENTION

The above problems are overcome with an adjustable riser according to the present invention. Embodiments of the adjustable riser disclosed herein allow a user to fluidically couple a water source to the sprinkler at variable heights, as may be needed over time. The adjustable riser can be set to a first height during installation and adjusted to a second height, for example, when the sprinkler becomes buried or surrounded by encroaching earth and vegetation. To adjust the sprinkler height, a user need only expose enough of the sprinkler to be grasped and rotated, by which action the adjustable riser can be set to a new height.

In a first embodiment, the adjustable riser includes a stationary channel and a hollow sleeve movable over the stationary channel. The stationary channel includes a body extending between an open upper end and a closed lower end. The lower end is configured to engage a water source. In some embodiments, the lower end may include a threaded stem for threadably connecting to the water source. A plurality of notches are defined in an outer surface of the body. The hollow sleeve partially encloses the stationary channel and includes a closed upper end and an open lower end to receive the open upper end of the stationary channel. A fluid seal is generated by engaging the stationary channel in the hollow sleeve. A collar is engaged to the open lower end of the hollow sleeve. The adjustable riser further includes a means for removably locking the hollow sleeve at a set vertical position on the stationary channel.

In some embodiments, the stationary channel may include at least one vertically recessed slot defined in the outer surface thereof. Preferably, the plurality of notches are connected to the vertical slot to form a recessed column. In some embodiments, there may be multiple recessed columns formed in the body of the stationary channel. Preferably, the recessed columns, including the notches and vertical slot, are symmetrically disposed around the stationary channel. Each notch defines one set vertical position at which the hollow sleeve may be set.

In some embodiments, the removable locking means includes a pin extending through the collar and the hollow sleeve to contact the outer surface of the stationary channel. Preferably, the pin contacts the recessed column formed in the outer surface of the stationary channel and is movable therein. In preferred embodiments, there is one pin per recessed column.

Vertical adjustment of the adjustable riser is achieved by rotating the hollow sleeve relative to the stationary channel. Rotation of the hollow sleeve causes the pin to move into and out of one of the notches. When the pin is rotated into a notch, the hollow sleeve is locked in the set vertical position defined by that notch. When the pin is rotated out of a notch, the hollow sleeve can be moved vertically while the pin moves within the vertical slot. Once the desired height is achieved, the hollow sleeve is again rotated to cause the pin to move back into a corresponding notch to lock the vertical position of the hollow sleeve relative to the stationary channel.

In some embodiments, the stationary channel may include an O-ring to generate a fluid seal with the internal surface of the hollow sleeve. Further, a fluid seal may also be generated by substantially matching the outer diameter of the stationary channel to the inner diameter of the hollow sleeve.

In alternative embodiments, the collar may include two apertures defined therethrough. Similarly, the hollow sleeve may include two holes defined through a lower end and substantially concentrically aligned with the two apertures through the collar. A set screw may extend through each aperture to contact the outer surface of the stationary channel. Rotation of the hollow sleeve relative to the stationary channel causes the set screw to engage and disengage one notch from the plurality of notches allowing for the vertical adjustment of the hollow sleeve relative to the stationary channel.

In further alternative embodiments, the adjustable riser may include a static channel and a gripping sleeve movable over the static channel. The static channel has a cylindrical body extending between an open upper end and a closed lower end. The lower end is configured to engage a water source, preferably via threaded connection between a lower stem and complimentary threading at the water source. Two or more recessed columns are defined in the outer surface of the body. Each recessed column is made up of a plurality of stacked notches connected to a vertical recessed slot. Preferably, the recessed columns are equally spaced apart from one another around the cylindrical body of the static channel. In contrast, the gripping sleeve has an open lower end engaged over the open upper end of the static channel defining a variable internal volume of the adjustable riser. The gripping sleeve has a closed upper end configured to engage a sprinkler, preferably via threaded connection between an upper stem and complimentary threads on the sprinkler. A plurality of detents are formed around an outer perimeter of the open lower end. A gripping collar includes a plurality of teeth configured to engage the plurality of detents. Engagement of the teeth with the detents causes the gripping collar to be locked to the gripping sleeve with the static channel extending therethrough. The adjustable riser also includes a means for removably locking the gripping sleeve at a set vertical position on the static channel.

In some embodiments, the removable locking means includes at least two pins integrally formed on the inner surface of the gripping collar. Each of the pins will engage one recessed column where each notch therein defines one set vertical position on the static channel. The gripping sleeve thus moves vertically over the static channel while the pins are positioned in the vertical slot. Further, the gripping sleeve is locked into position when the pins are rotated into engagement with one of the plurality of notches.

These and other features of the disclosed invention will become apparent to the skilled artisan in view of the following disclosure.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. Dimensions shown are exemplary only. In the drawings, like reference numerals may designate like parts throughout the different views, wherein:

DETAILED DESCRIPTION OF THE INVENTION

The following disclosure presents exemplary embodiments of a height adjustable sprinkler riser. The adjustable riser can be installed with a new irrigation system or as an aftermarket component used to raise a buried sprinkler. The adjustable riser is designed to be universally compatible with conventional sprinklers regardless of the manufacturer, including those sprinklers manufactured by Rain Bird®, Orbit®, Hunter® and Toro®, among others. The adjustable riser allows an operator to adjust the height of the sprinkler without having to dig up the sprinkler line to replace an existing riser. Rather, the operator need only expose a sufficient portion of the buried sprinkler to grasp and rotate, by which action the adjustable riser can be set to a new height. These and other advantages will become apparent to those skilled in the art in view of the following disclosure.

Figure 1:
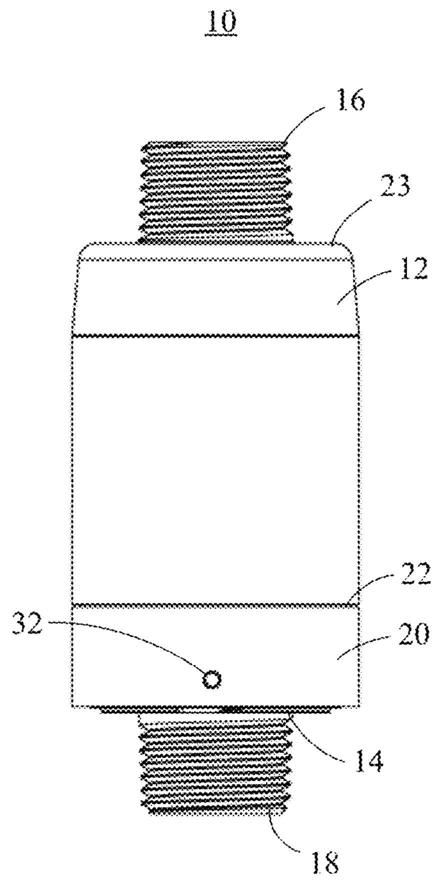
FIG. 1 is a side view of a first embodiment of an adjustable riser according to the present invention.

FIG. 1 is a side view of a first embodiment of an adjustable riser according to the present invention. The adjustable riser 10 is illustrated as being in a fully stowed position. The adjustable riser 10 has a stationary channel 14 and a hollow sleeve 12 partially enclosing the stationary channel. As will be explained in more detail below, the hollow sleeve 12 is movable over the stationary channel 14. The internal volume defined by the hollow sleeve 12 attached over the stationary channel 12 generates a fluidically sealed environment so that fluid introduced therein does not leak or is otherwise not released except from the defined outlet, e.g., the terminal end 16. The internal volume of the adjustable riser 10 may vary as the vertical length of the adjustable riser 10 is increased or decreased, e.g., the internal volume when the adjustable riser is fully stretched will be greater than the internal volume when the adjustable riser is fully stowed as in FIG. 1.

The terminal end 16 of the hollow sleeve 12 is configured to engage a sprinkler, preferably via threaded engagement. Similarly, the lower terminal end 18 of the stationary channel 14 is configured to engage a water source, preferably via threaded engagement. The terminal end 16 defines the outlet from the adjustable riser 10 whereas the lower terminal end 18 defines the inlet to the adjustable riser 10. In some embodiments, a collar 20 may be engaged to a lower end 22 of the hollow sleeve 12. The collar 20 similarly encloses a portion of the stationary channel 14 when engaged to the hollow sleeve. The lower end 22 of the hollow sleeve 12 is open to receive the stationary channel 14 therein. In contrast, the upper end 23 is closed to define an internal volume when the hollow sleeve 12 is engaged to the stationary channel 14. The internal volume may be adjusted based on the relative positioning of the hollow sleeve 12 over the stationary channel 14.

Figure 2:
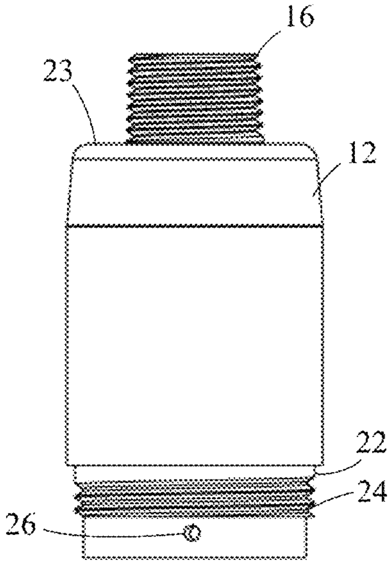
FIG. 2 is a side view of a hollow sleeve according to the invention removed from the adjustable riser of FIG. 1.

FIG. 2 is a side view of an embodiment of the hollow sleeve 12 according to the present invention, shown removed from the adjustable riser 10. The lower end 22 of the hollow sleeve 12 preferably includes threads 24 to engage the collar 20. At least one hole 26 may be defined through the lower end 22 of the hollow sleeve 12. In preferred embodiments, there are two holes 26 formed on substantially opposite sides of the hollow sleeve 12. The hole 26 extends into the internal channel defined by the hollow sleeve 12. The hole 26 may receive a pin or a set screw designed to engage an outer surface of the stationary channel 14, as explained in more detail below.

Figure 3:
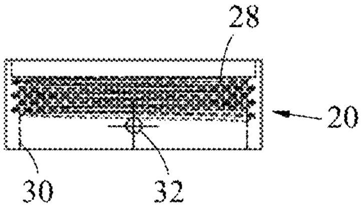
FIG. 3 is a partially transparent side view of a collar according to the invention removed from the adjustable riser of FIG. 1.

FIG. 3 is a partially transparent view of an embodiment of the collar 20 removed from the hollow sleeve 12. The collar 20 includes complimentary threads 28 configured to engage the threads 24 on the lower end 22 of the hollow sleeve 12. The collar 20 is open-ended 30 so that the collar can be threadably engaged to the hollow sleeve 12 while providing the necessary opening to receive the stationary channel 14. An aperture 32 is defined through the collar 20 and configured to align with the hole 26 when the collar 20 is attached to the hollow sleeve. Preferably, there are two apertures 32 formed on substantially opposite sides of the collar 20. Each aperture 32 will align with one hole 26 defined through the lower end 22 of the hollow sleeve 12 when the collar is engaged thereto.

Figure 4:
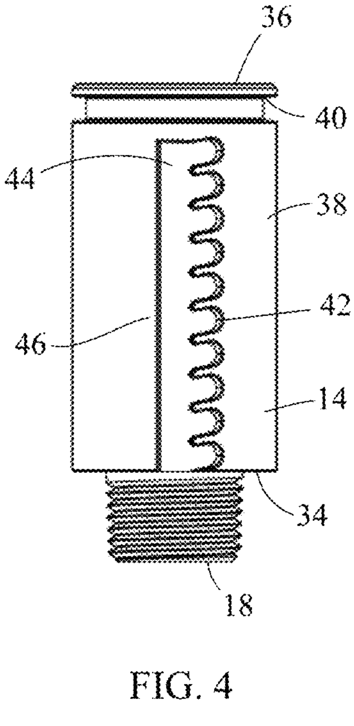
FIG. 4 is a side view of a stationary channel according to the invention removed from the adjustable riser of FIG. 1.

FIG. 4 is a side view of an embodiment of the stationary channel 14 according to the present invention, shown removed from the remaining components of the adjustable riser 10. The lower end 34 of the stationary channel 14 is closed. In contrast, the upper end 36 is open. A body 38 extends between the closed lower end 34 and the open upper end 36. An internal channel extends through the body 38 of the stationary channel 14. The terminal end 18 is in fluid communication with the internal channel so that fluid introduced at the terminal end 18, e.g., from a water source threadably coupled to the stationary channel, is similarly introduced into the internal channel. In preferred embodiments, the inner diameter of the hollow sleeve 12 is substantially equal to the outer diameter of the stationary channel 14. The similarities between the inner diameter of the hollow sleeve 12 and the outer diameter of the stationary channel 14 aid in sealing the internal volume of the adjustable riser 10. An annular notch 40 may be formed proximate to the open upper end 36. The annular notch 40 preferably seats an O-ring 48 that will sealingly engage the inner surface of the hollow sleeve 12. The similarities between the inner diameter of the hollow sleeve 12 and the outer diameter of the stationary channel 14, and the O-ring 48 contacting the inner surface of the hollow sleeve, generate a fluidically sealed internal environment of the adjustable riser 10. Thus, fluid introduced at the terminal end 18 can only escape from the adjustable riser 10 through the terminal end 16, which is preferably connected to a sprinkler.

In some preferred embodiments, the stationary channel 14 includes a plurality of vertically stacked notches 42 formed in the outer surface of the body 38. Each of the notches 42 is designed to extend in a direction perpendicular to a longitudinal axis of the stationary channel 14. The stationary channel 14 further includes a vertically recessed slot 44 defined in the outer surface of the body 38. In preferred embodiments, each of the vertically stacked notches 42 are linked with the vertically recessed slot 44 to form a recessed column 46. Each of the notches 42 defines a set vertical position to which the hollow sleeve 12 may be locked when the device is assembled. Note, in preferred embodiments, the opposite side of the body 38, not shown by FIG. 4, similarly includes a plurality of vertically stacked notches 42 linked to a vertical slot 44 to form a second recessed column that is substantially identical to the recessed column 46.

Figure 5:
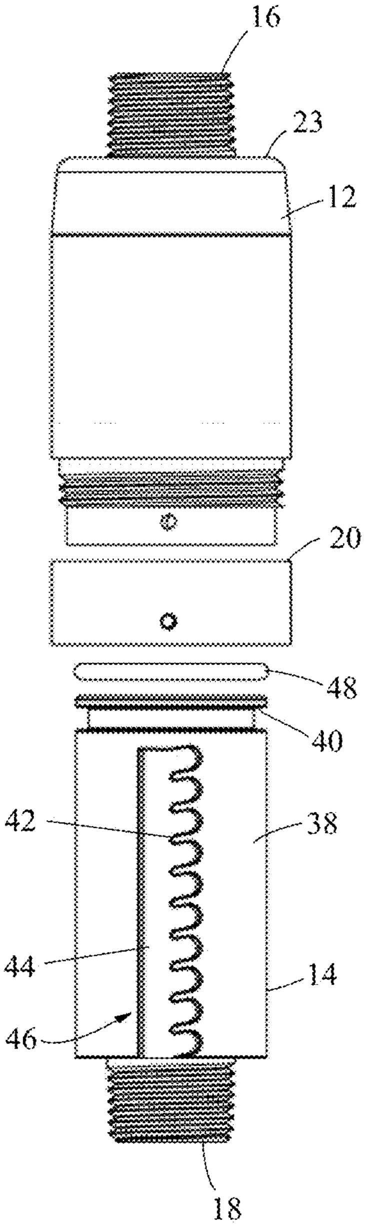
FIG. 5 is an exploded side view of an adjustable riser according to the present invention.
Figure 6:
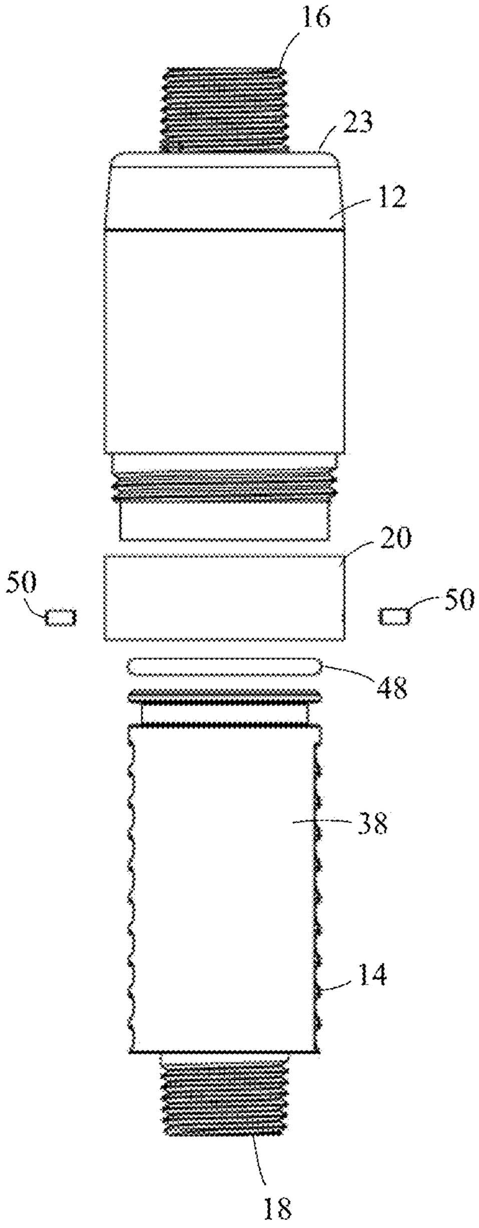
FIG. 6 is a second exploded side view, rotated 90 degrees with respect to FIG. 5, of an adjustable riser according to the invention.

FIG. 5 is an exploded side view of an embodiment of the adjustable riser 10 according to the present invention. FIG. 6 is a second exploded side view of the adjustable riser, rotated substantially 90-degrees with respect to FIG. 5. The adjustable riser 10 includes a means for removably locking the hollow sleeve 12 at a set vertical position on the stationary channel 14. The set vertical position corresponds to and is defined by the plurality of vertically stacked notches 42 where each notch provides one set vertical position. The hollow sleeve 12 partially encloses the stationary channel 14 and is slidable or movable thereover.

In some preferred embodiments, the adjustable riser 10 further includes a pin or set screw 50. Preferably, there are two pins 50 arranged on opposite sides of the adjustable riser 10. The pins 50 are designed to extend through the aperture 32 and the hole 26 to contact the outer surface of the body 38.

In some alternative embodiments, the pins 50 may be formed integrally with the hollow sleeve 12, therefore alleviating the need for the collar 20. Alternatively, the hole 26 may be threaded to receive a removable set screw. In further alternative embodiments, the collar 20 may be integrally molded with the hollow sleeve 12 and two or more pins 50 may extend therethrough or be formed on an inner surface to contact the stationary channel 14.

Preferably, the removable locking means comprises the pins 50 extending through the aligned holes 32 and 26 to contact the body 38 of the stationary channel 14, preferably in the recessed column 46 formed on the outer surface of the body. The pins 50, when installed in the collar 20 and extending through the hollow sleeve 12, are movable within each recessed column 46. In use, rotation of the hollow sleeve 12 relative to the stationary channel 14 moves the pins 50 either into or out of one of the vertically stacked notches 42. Further, when the pins 50 are positioned in the vertical slot 44, the hollow sleeve 12 may be slid or otherwise moved longitudinally over the body 38 of the stationary channel 14 to adjust the vertical position of the hollow sleeve 12 relative to the stationary channel 14. The hollow sleeve 12 may be rotated again to move the pins 50 back into one of the notches 42 to lock the hollow sleeve 12 into position.

When deployed, a user can quickly and easily adjust the vertical height of a sprinkler by simply rotating hollow sleeve 12 relative to the stationary channel 14, which would typically be at least partially buried in the soil and connected to a water line buried deeper in the soil. In some scenarios, a user may only be required to expose a sufficient amount of the sprinkler attached to the adjustable riser 10 to be able to grasp and rotate the sprinkler, which will similarly rotate the hollow sleeve 12 relative to the stationary channel 14. Once the pins 50 have been disengaged from one of the notches 42 and moved into the vertical slot 44, a user can simply push or pull the hollow sleeve 12 relative to the stationary channel 14 until the desired height has been reached. Thereafter, the user simply rotates the hollow sleeve 12 relative to the stationary channel 14 to re-engage the pins 50 into one of the notches 42 corresponding to the newly desired height.

The adjustable riser 10 therefore allows a user to adjust the height of a sprinkler without having to completely replace the riser after installation. Minimal digging is required to adjust the height of the adjustable riser 10. A user may only need to expose a sufficient amount of the sprinkler attached to the adjustable riser 10 to be able to grasp and rotate the sprinkler, which in turn rotates the hollow sleeve 12 relative to the stationary channel 14 allowing the user to reset the height. The amount of vertical adjustment possible is dependent on the size of the adjustable riser 10 deployed. For example, the height of the recessed column 46 may be substantially equal to about 4 inches, which would provide for vertical adjustments from about 4 inches when the adjustable riser 10 is in a fully stowed position, e.g., FIG. 1, to about 8 inches when the adjustable riser is in a fully extended position. The amount of vertical adjustment may be scaled up or down depending on the specific embodiment of the adjustable riser 10 and the needs of the user.

Figure 7:
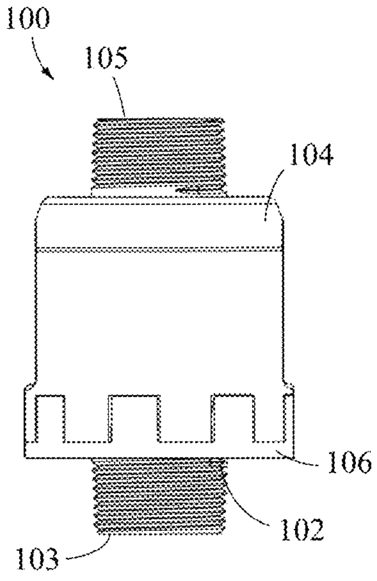
FIG. 7 is a side view of a second embodiment of an adjustable riser according to the present invention.

FIG. 7 is a side view of an alternative embodiment of a locking riser according to the present invention. The locking riser 100 is similar to the adjustable riser 10 described above. The locking riser 100 includes a static channel 102 and a hollow gripping sleeve 104 movable over the static channel. A terminal end 103 of the static channel 102 is configured to threadably engage a water source, such as a main water line. The terminal end 103 defines an inlet into the static channel 102. Similarly, the terminal end 105 of the gripping sleeve 104 is configured to threadably engage a sprinkler. The terminal end 105 defines an outlet from the locking riser 100. The terminal end 103 is fluidically connected to the terminal end 105.

Figure 8:
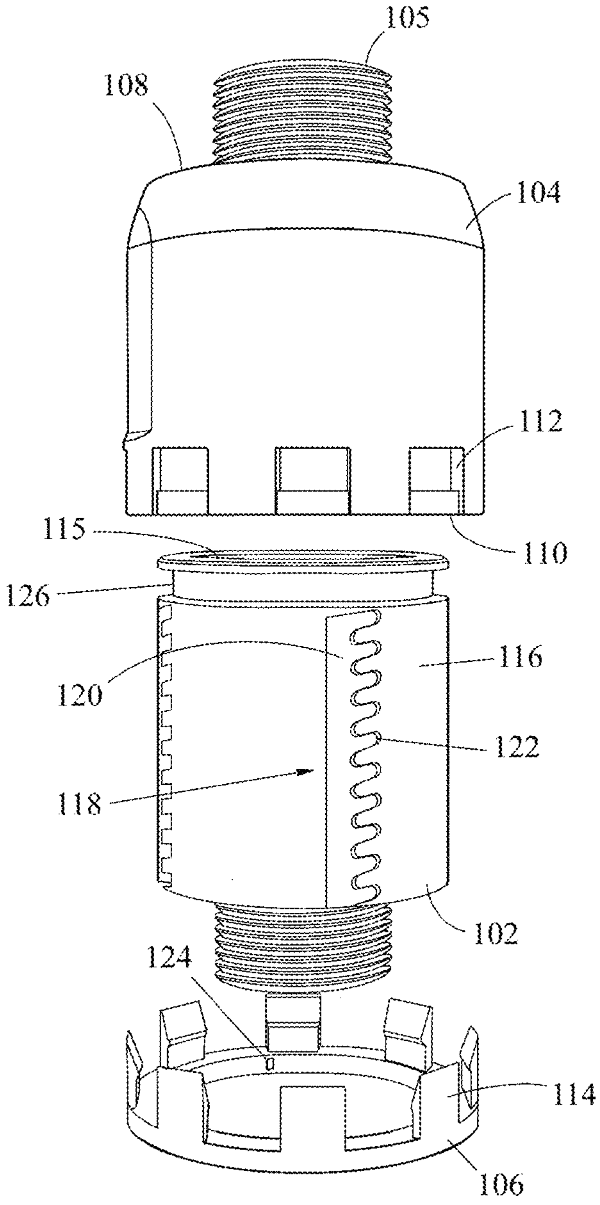
FIG. 8 is an exploded perspective view of the second embodiment of the adjustable riser according to the present invention.

FIG. 8 is an exploded perspective view of the locking riser 100 according to the second embodiment of the present invention. Similar to the hollow sleeve 12, the gripping sleeve 104 includes a closed upper end 108 and an open lower end 110. The open lower end 110 includes a plurality of detents 112 formed around the outer perimeter of the gripping sleeve 104. A removable gripping collar 106 engages the hollow gripping sleeve 104 over the static channel 102. The gripping collar 106 includes a plurality of teeth 114 that engage the detents 112 formed about the open lower end 110 of the gripping sleeve 104. Each of the teeth 114 on the gripping collar 106 will engage one of the detents 110 to lock the gripping collar 106 to the gripping sleeve 104 over the static channel.

The static channel 102 is similar to the stationary channel 14. Opposite the terminal end 103, the static channel 102 has an open upper end 115. The outer surface 116 of the static channel 102 has at least one recessed column 118 that includes a vertical slot 120 connected with a plurality of horizontal notches 122. In preferred embodiments, the static channel 102 is substantially cylindrical and includes four recessed columns 118 equally spaced around the static channel, e.g., every 90-degrees. Preferably, the recessed columns 118 are symmetrically disposed around the static channel 102. The notches 122 are vertically stacked so that each notch defines one set vertical position of the locking riser 100.

The locking riser 100 includes a means for removably locking the gripping sleeve 104 at a set vertical position on the static channel 102. In some embodiments, the gripping collar 106 includes at least one pin 124 integrally formed therewith. Preferably, there are at least four pins 124 formed about the inner surface of the gripping collar 106. Each pin 124 is configured to engage the outer surface 116 of the static channel 102 in one of the recessed columns 118 formed thereabout. The pins 124 are preferably symmetrically disposed about the inner surface of the gripping collar 106 and align with the symmetrically disposed recessed columns 118 formed on the static channel 102 when the collar is engaged to the gripping sleeve 104. In preferred embodiments, the removable locking means includes the pins 124 movable within the recessed columns 118 when the gripping collar 106 is engaged to gripping sleeve 104.

Operation of the locking riser 100 is similar to that of the adjustable riser 10 described above. The teeth 114 of the gripping collar 106 align with and are engaged to the detents 112 on the gripping sleeve 104 to lock the collar and sleeve together over the static channel 102. Each pin 124 is aligned in one recessed column 118 so that the gripping sleeve 104 can be moved vertically over the static channel 102. A user can adjust the height of a sprinkler by adjusting the vertical position of the gripping sleeve 104 over the static channel 102. Rotation of the gripping sleeve 104 relative to the static channel 102 causes the pins 124 to move into or out of the notches 122. Rotation of the pins 124 into one of the notches 122 locks the gripping sleeve 104 into position relative to the static channel 102 to set the vertical height of the locking riser 100. When the pins 124 are rotated into the vertical slot 120, the gripping sleeve 104 may be slid or otherwise moved over the static channel 102 to adjust the vertical height of the sleeve relative to the static channel. Once the desired height is set, the user simply rotates the gripping sleeve 104 relative to the static channel 102 to re-engage the pins 124 with the notches 122.

In preferred embodiments, the outer diameter of the static channel 102 is substantially equal to the inner diameter of the gripping sleeve 104 to fluidically seal the internal volume when the sleeve is engaged to the channel. In some embodiments, the static channel 102 may include an annular recess 126 housing an O-ring to further seal the internal volume when the channel is engaged to the sleeve 104.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An adjustable riser for an irrigation system, comprising:

a stationary channel having an open upper end, a lower end, and a body extending between the open upper end and the lower end, an internal flow channel defined through the body, and a plurality of notches defined along a longitudinal length of the body;

a hollow sleeve configured to at least partially enclose the stationary channel, the hollow sleeve having a closed upper end, an open lower end, and an upper stem configured to engage a sprinkler extending from the closed upper end, and at least two holes defined through the hollow sleeve, wherein the open lower end is configured to slidably engage the stationary channel;

a collar engaged to the open lower end of the hollow sleeve, the collar having at least two apertures defined therethrough, wherein the hollow sleeve comprises at least two holes substantially concentrically aligned with the at least two apertures; and a means for removably locking the hollow sleeve at a set vertical position on the stationary channel.

2. The adjustable riser of claim 1, further comprising at least one vertically recessed slot defined in an outer surface of the body.

3. The adjustable riser of claim 2, wherein each notch is linked to the vertically recessed slot to define at least one recessed column.

4. The adjustable riser of claim 3, wherein each notch defines one set vertical position on the stationary channel.

5. The adjustable riser of claim 4, wherein the removable locking means comprises at least one pin extending through the collar and the hollow sleeve to contact the body of the stationary channel.

6. The adjustable riser of claim 5, wherein the pin is configured to move vertically and horizontally within the recessed column.

7. The adjustable riser of claim 6, wherein rotation of the hollow sleeve relative to the stationary channel moves the pin into and out of one of the plurality of notches to set the vertical position.

8. The adjustable riser of claim 7, wherein when the pin is in the vertically recessed slot, the hollow sleeve is slidable vertically over the stationary channel.

9. The adjustable riser of claim 1, wherein the stationary channel is configured to generate a fluid seal with an internal surface of the hollow sleeve.

10. The adjustable riser of claim 1, wherein the upper end of the stationary channel further comprises an O-ring configured to generate a fluid seal between the stationary channel and an inner surface of the hollow sleeve.

11. The adjustable riser of claim 1, wherein a set screw extends through each aperture to contact the body of the stationary channel.

12. The adjustable riser of claim 11, wherein rotation of the hollow sleeve relative to the stationary channel causes the set screw to engage and disengage from one of the plurality of notches allowing for vertical adjustment of the hollow sleeve relative to the stationary channel.

13. The adjustable riser of claim 1, wherein the lower end of the stationary channel is in fluid communication with the upper stem of the hollow sleeve.

14. The adjustable riser of claim 1, wherein the lower end of the stationary channel is configured to engage a fluid source.

15. An adjustable riser for an irrigation system, comprising:

a static channel having a cylindrical body extending between an open upper end and a closed lower end having a threaded stem configured to engage a water source, two or more recessed columns defined in an outer surface of the body, wherein each recessed column has a plurality of stacked notches connected to a vertical slot;

a gripping sleeve movable over the static channel, the gripping sleeve having an open lower end engaged over the open upper end of the static channel to define an internal volume, a closed upper end, a threaded stem extending from the closed upper end and configured to engage a sprinkler, and a plurality of detents formed around an outer perimeter of the open lower end;

a gripping collar having a plurality of teeth configured to engage the plurality of detents and lock the gripping collar to the gripping sleeve over the static channel; and a means for removably locking the gripping sleeve at a set vertical position on the static channel.

16. The adjustable riser of claim 15, wherein the removable locking means comprises two or more pins formed about an inner surface of the gripping collar, the two or more pins configured to engage the two or more recessed columns.

17. The adjustable riser of claim 16, wherein each notch defines one set vertical position.

18. The adjustable riser of claim 16, wherein the gripping sleeve slides vertically over the static channel when the pins are positioned in the vertical slot of the recessed columns and wherein the gripping sleeve is locked into a vertical position when the pins are positioned in one of the plurality of notches.

19. An adjustable riser for an irrigation system, comprising:

a stationary channel having an open upper end, a lower end, and a body extending between the open upper end and the lower end, an internal flow channel defined through the body, and a plurality of notches defined along a longitudinal length of the body;

at least one vertically recessed slot defined in an outer surface of the body, wherein each notch is linked to the vertically recessed slot to define at least one recessed column such that each notch defines one set vertical position on the stationary channel;

a hollow sleeve configured to at least partially enclose the stationary channel, the hollow sleeve having a closed upper end, an open lower end, and an upper stem configured to engage a sprinkler extending from the closed upper end and wherein the open lower end is configured to slidably engage the stationary channel;

a collar engaged to the open lower end of the hollow sleeve; and at least one pin extending through the collar and the hollow sleeve to contact the body of the stationary channel and removably lock the hollow sleeve at the set vertical position of one of the notches.

* * * * *